(12) United States Patent
Wietfeldt et al.

(10) Patent No.: US 9,736,875 B2
(45) Date of Patent: Aug. 15, 2017

(54) DEVICE TO-DEVICE RADIO COEXISTENCE MANAGEMENT

(71) Applicant: QUALCOMM Incorporated, San Diego, CA (US)

(72) Inventors: Richard Dominic Wietfeldt, San Diego, CA (US); George Chrisikos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 14/610,379

(22) Filed: Jan. 30, 2015

(65) Prior Publication Data

US 2016/0143074 A1 May 19, 2016

Related U.S. Application Data

(60) Provisional application No. 62/082,012, filed on Nov. 19, 2014.

(51) Int. Cl.
| | |
|---|---|
| *H04W 4/00* | (2009.01) |
| *H04W 76/02* | (2009.01) |
| *H04B 15/00* | (2006.01) |
| *H04W 76/04* | (2009.01) |
| *H04W 88/06* | (2009.01) |
| *H04W 92/18* | (2009.01) |

(52) U.S. Cl.
CPC .......... *H04W 76/023* (2013.01); *H04B 15/00* (2013.01); *H04W 4/008* (2013.01); *H04W 76/025* (2013.01); *H04W 76/043* (2013.01); *H04W 88/06* (2013.01); *H04W 92/18* (2013.01)

(58) Field of Classification Search
CPC ............. H04W 76/023; H04W 76/025; H04W 76/043; H04W 4/008; H04W 88/06; H04W 92/18; H04B 15/00
USPC ........................................................ 370/329
See application file for complete search history.

(56) References Cited

U.S. PATENT DOCUMENTS

| | | | |
|---|---|---|---|
| 9,295,096 B1 * | 3/2016 | Shukla .................. | H04W 84/12 |
| 2010/0120362 A1 * | 5/2010 | Walley .................. | H04W 16/14 |
| | | | 455/41.2 |
| 2010/0331029 A1 | 12/2010 | Linsky et al. | |
| 2011/0116488 A1 * | 5/2011 | Grandhi ............... | H04B 7/0626 |
| | | | 370/338 |
| 2012/0213116 A1 | 8/2012 | Koo et al. | |

(Continued)

FOREIGN PATENT DOCUMENTS

| | | |
|---|---|---|
| WO | 2013119473 A1 | 8/2013 |
| WO | 2014014325 A1 | 1/2014 |

OTHER PUBLICATIONS

International Search Report and Written Opinion—PCT/US2015/056255—ISA/EPO—Feb. 1, 2016.

*Primary Examiner* — Peter Cheng
(74) *Attorney, Agent, or Firm* — Seyfarth Shaw LLP

(57) ABSTRACT

Direct device-to-device (D2D) communications may be coordinated to reduce interference to the sets of radios involved in the individual device-to-base station or device-to-access point communications for the individual devices of the D2D communications. Coexistence management plans for the individual devices may be used to determine a D2D coexistence management plan to reduce interference among the many communications, both for the D2D communications and for non-D2D communications of the individual devices.

20 Claims, 11 Drawing Sheets

(56) References Cited

U.S. PATENT DOCUMENTS

2013/0201915 A1    8/2013   Wang
2014/0274066 A1    9/2014   Fodor et al.
2014/0321314 A1   10/2014   Fodor et al.

* cited by examiner

DEVICE TO-DEVICE RADIO COEXISTENCE MANAGEMENT

CROSS-REFERENCE TO RELATED APPLICATION

This application claims priority to U.S. Provisional Patent Application No. 62/082,012, entitled DEVICE-TO-DEVICE RADIO COEXISTENCE MANAGEMENT, filed on Nov. 19, 2014, in the names of WIETFELDT, et al., the disclosure of which is expressly incorporated by reference herein in its entirety.

BACKGROUND

Field

Aspects of the present disclosure relate generally to multi-radio techniques and, more specifically, to coexistence techniques for multi-radio devices.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different radio access technologies (RATs). Examples of RATs include, e.g., universal mobile telecommunications system (UMTS), global system for mobile communications (GSM), CDMA2000, WiMAX, WLAN (e.g., WiFi), Bluetooth, LTE, and the like.

An example mobile device includes an LTE user equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a global positioning system (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the industrial scientific and medical (ISM) band and may cause interference therewith. It is noted that Bluetooth and some wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher than reflected in the measurement reports of the new channel based on reference signal received power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

A method performed by a first user equipment (UE) is offered. The method comprises communicating using a first radio of the first UE. The method also includes communicating using a second radio of the first UE. The method still further includes sending a second UE a first communication configuration. The first communication configuration may describe the first UE's communications using the first radio and the second radio and describe a first coexistence solution operated by the first UE. The method further includes receiving from the second UE a second communication configuration. The second communication configuration may describe the second UE's communications using at least one radio of the second UE and describe a second coexistence solution operated by the second UE. The method still further includes determining a device-to-device communication configuration. The device-to-device communication configuration may govern communications between the first UE and the second UE. The device-to-device communication configuration may be based the first communication configuration and the second communication configuration. The method still further includes establishing a communication connection with the second UE using the device-to-device communication configuration.

An apparatus for wireless communications is offered. The apparatus includes means for communicating using a first radio of a first user equipment (UE). The apparatus also includes means for communicating using a second radio of the first UE. The apparatus further includes means for sending a second UE a first communication configuration. The first communication configuration may describe the first UE's communications using the first radio and the second radio and describe a first coexistence solution operated by the first UE. The apparatus further includes means for receiving from the second UE a second communication configuration. The second communication configuration may describe the second UE's communications using at least one radio of the second UE and describe a second coexistence solution operated by the second UE. The apparatus still further includes means for determining a device-to-device communication configuration. The device-to-device communication configuration may govern communications between the first UE and the second UE. The device-to-device communication configuration may be based on the first communication configuration and the second communication configuration. The apparatus still further includes means for establishing a communication connection with the second UE using the device-to-device communication configuration.

A computer program product configured for wireless communication is offered. The computer program product includes a non-transitory computer-readable medium having non-transitory program code recorded thereon. The program code includes program code to communicate using a first radio of a first user equipment (UE). The program code also includes program code to communicate using a second radio of the first UE. The program code also includes program code to send a second UE a first communication configuration. The first communication configuration may describe the first UE's communications using the first radio and the second radio and describe a first coexistence solution operated by the first UE. The program code further includes program code to receive from the second UE a second communication configuration. The second communication configuration may describe the second UE's communications using at least one radio of the second UE and describe a second coexistence solution operated by the second UE. The program code still further includes program code to determine a device-to-device communication configuration. The device-to-device communication configuration may govern communications between the first UE and the second UE. The device-to-device communication configuration may be based on the first communication configuration and the second communication configuration. The program code still further includes program code to establish a communication connection with the second UE using the device-to-device communication configuration.

An apparatus for wireless communications is offered. The apparatus includes a memory and at least one processor coupled to the memory. The processor(s) is configured to communicate using a first radio of a first user equipment (UE). The processor(s) is also configured to communicate using a second radio of the first UE. The processor(s) is also configured to send a second UE a first communication configuration. The first communication configuration may describe the first UE's communications using the first radio and the second radio and describe a first coexistence solution operated by the first UE. The processor(s) is further configured to receive from the second UE a second communication configuration. The second communication configuration may describe the second UE's communications using at least one radio of the second UE and describe a second coexistence solution operated by the second UE. The processor(s) is still further configured to determine a device-to-device communication configuration. The device-to-device communication configuration may govern communications between the first UE and the second UE. The device-to-device communication configuration may be based on the first communication configuration and the second communication configuration. The processor(s) is still further configured to establish a communication connection with the second UE using the device-to-device communication configuration.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Various aspects of the disclosure provide techniques to mitigate coexistence issues in multi-radio devices, where significant in-device coexistence problems can exist between, e.g., the LTE and industrial scientific and medical (ISM) bands (e.g., for BT/WLAN). In particular, device-to-device communications (sometimes referred to as "peer-to-peer" communications) may result in interference among radios of the individual devices. To account for such communications, a coexistence protocol may be configured to account for not only communications between a UE and various base stations and/or access points (APs) but also for communications between UEs directly. Such a device-to-device coexistence protocol is explained in detail below.

The techniques described herein can be used for various wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, etc. The terms "networks" and "systems" are often used interchangeably. A CDMA network can implement a radio technology such as universal terrestrial radio access (UTRA), CDMA2000, etc. UTRA includes Wideband-CDMA (W-CDMA) and low chip rate (LCR). CDMA2000 covers IS-2000, IS-95 and IS-856 standards. A TDMA network can implement a radio technology such as global system for mobile communications (GSM). An OFDMA network can implement a radio technology such as evolved UTRA (E-UTRA), IEEE 802.11, IEEE 802.16, IEEE 802.20, Flash-OFDM®, etc. UTRA, E-UTRA, and GSM are part of universal mobile telecommunication system (UMTS). Long term evolution (LTE) is an upcoming release of UMTS that uses E-UTRA. UTRA, E-UTRA, GSM, UMTS and LTE are described in documents from an organization named "3$^{rd}$ Generation Partnership Project" (3GPP). CDMA2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP long term evolution (LTE), or Evolved UTRA.

Figure 1:
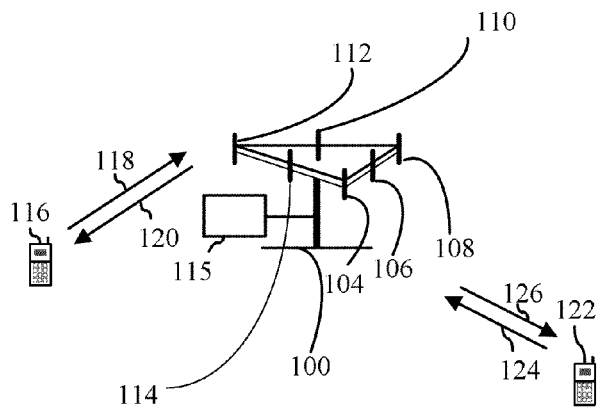
FIG. 1 illustrates a multiple access wireless communication system according to one aspect.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A user equipment (UE) 116 (also referred to as an access terminal (AT)) is in communication with antennas 112 and 114, while antennas 112 and 114 transmit information to the UE 116 over a downlink (DL) 120 and receive information from the UE 116 over an uplink (UL) 118. The UE 122 is in communication with antennas 106 and 108, while antennas 106 and 108 transmit information to the UE 122 over a downlink (DL) 126 and receive information from the UE 122 over an uplink 124. In a frequency division duplex (FDD) system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
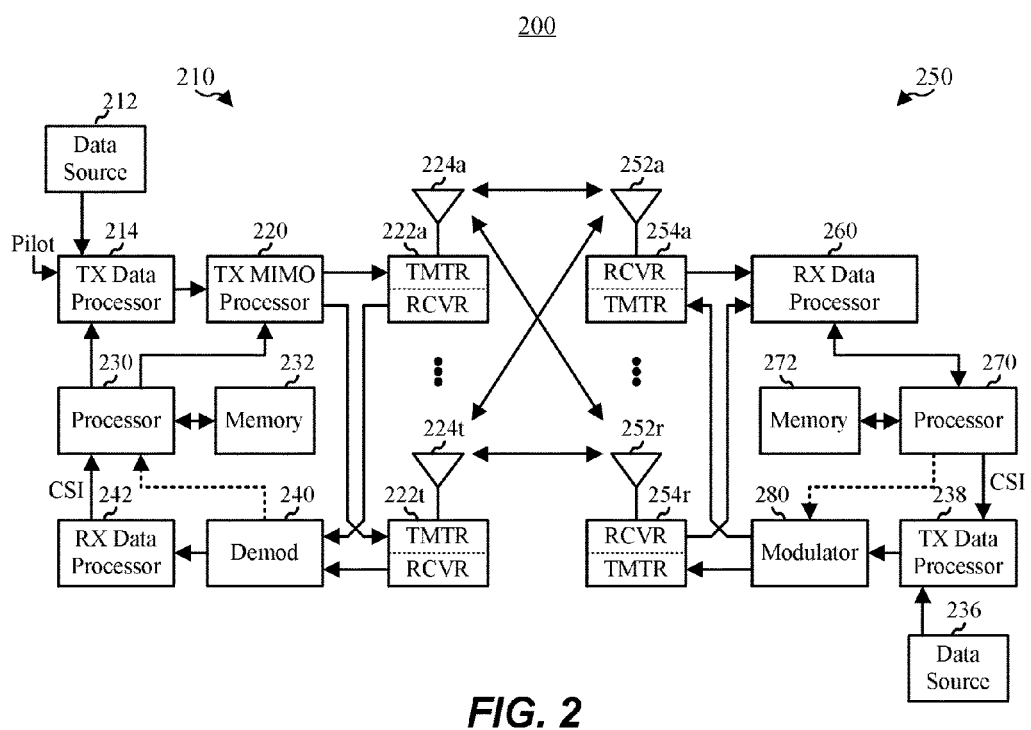
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
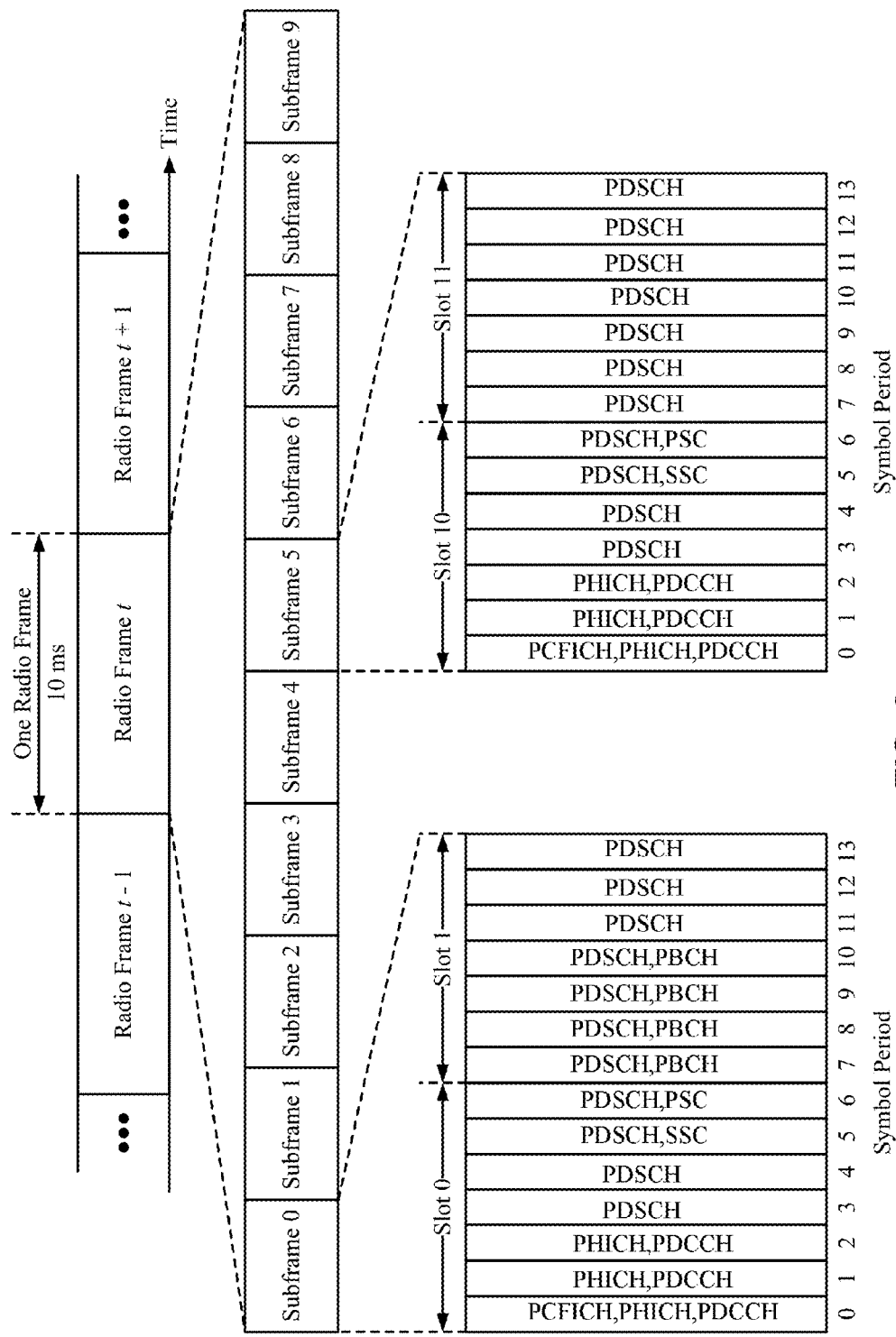
FIG. 3 illustrates an exemplary frame structure in downlink long term evolution (LTE) communications.

FIG. 3 is a block diagram conceptually illustrating an exemplary frame structure in downlink long term evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a physical broadcast channel (PBCH) in symbol periods 0 to 3 in slot 1 of subframe 0. The PBCH may carry certain system information.

The eNB may send a cell-specific reference signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, radio link monitoring (RLM), reference signal received power (RSRP), and reference signal received quality (RSRQ) measurements, etc.

The eNB may send a physical control format indicator channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth (e.g., with less than 10 resource blocks). In the example shown in FIG. 3, M=3. The eNB may send a physical HARQ indicator channel (PHICH) and a physical downlink control channel (PDCCH) in the first M symbol periods of each subframe. The PDCCH and PHICH are also included in the first three symbol periods in the example shown in FIG. 3. The PHICH may carry information to support hybrid automatic repeat request (HARM). The PDCCH may carry information on resource allocation for UEs and control information for downlink channels. The eNB may send a physical downlink shared channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
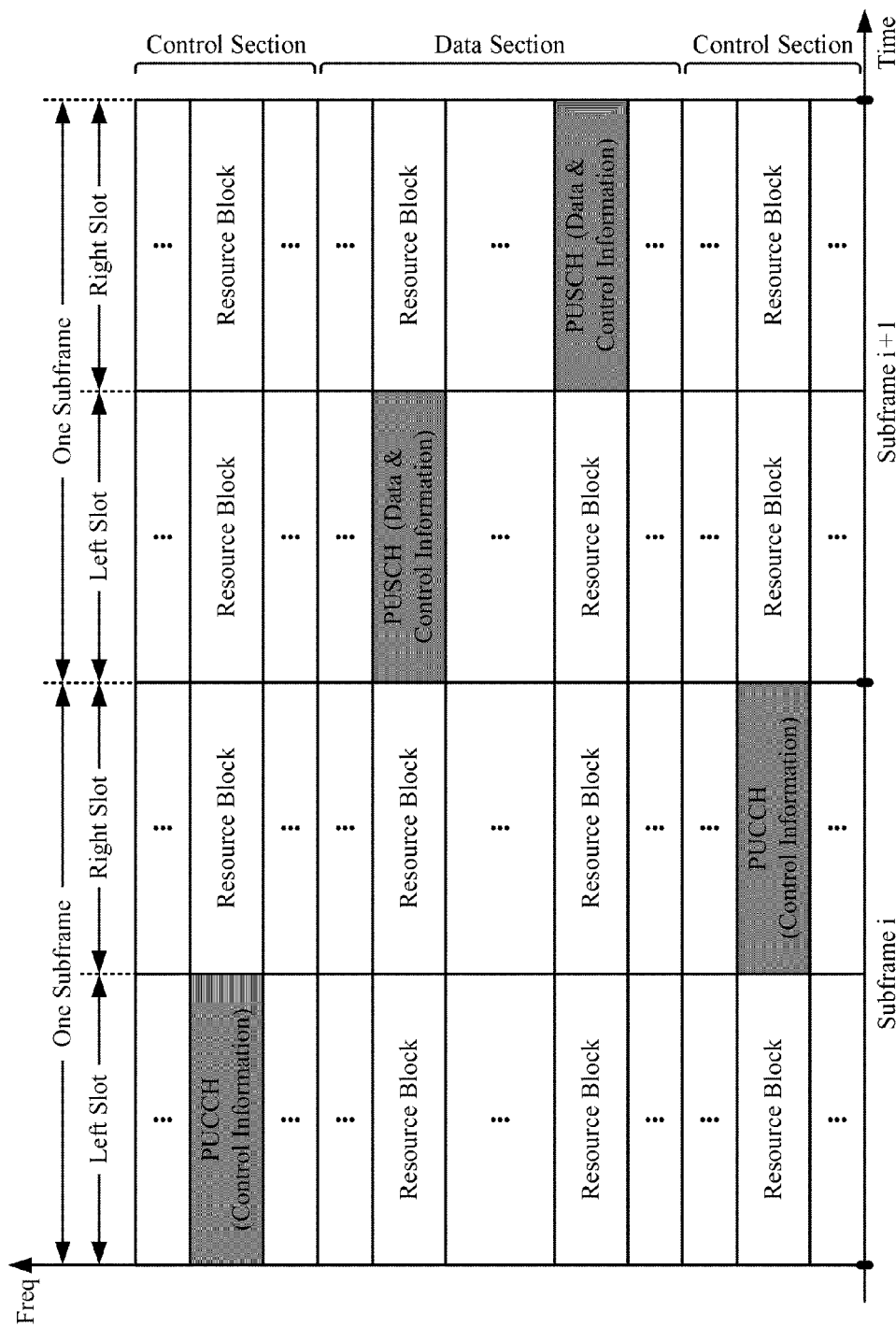
FIG. 4 is a block diagram conceptually illustrating an exemplary frame structure in uplink long term evolution (LTE) communications.

FIG. 4 is a block diagram conceptually illustrating an exemplary frame structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
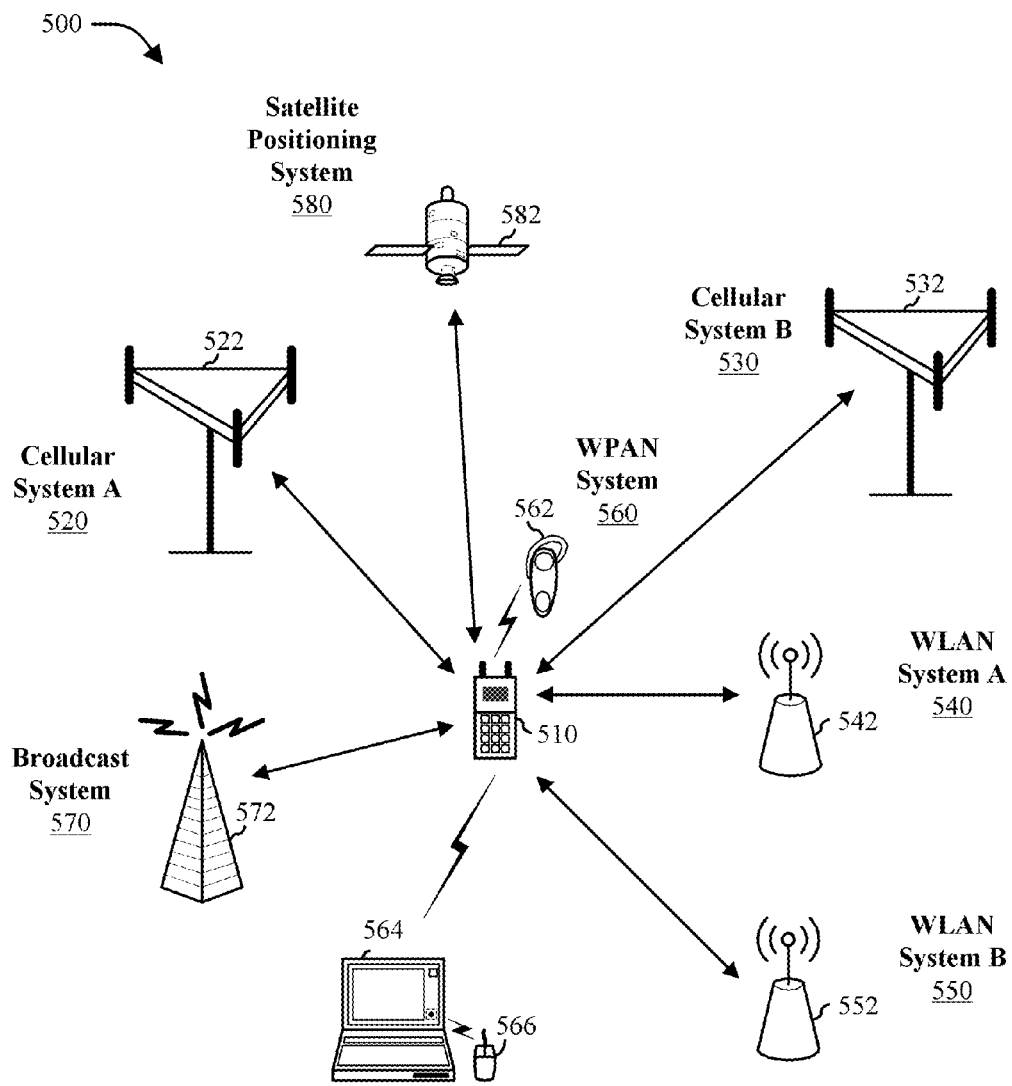
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, single carrier FDMA (SC-FDMA), or other suitable system. A CDMA system can implement a radio technology such as universal terrestrial radio access (UTRA), CDMA2000, etc. UTRA includes wideband CDMA (WCDMA) and other variants of CDMA. Moreover, CDMA2000 covers IS-2000 (CDMA2000 1x), IS-95 and IS-856 (HRPD) standards. A TDMA system can implement a radio technology such as global system for mobile communications (GSM), digital advanced mobile phone system (D-AMPS), etc. An OFDMA system can implement a radio technology such as evolved UTRA (E-UTRA), ultra mobile broadband (UMB), IEEE 802.16 (WiMAX), IEEE 802.20, Flash-OFDM®, etc. UTRA and E-UTRA are part of universal mobile telecommunication system (UMTS). 3GPP long term evolution (LTE) and LTE-Advanced (LTE-A) are new releases of UMTS that use E-UTRA. UTRA, E-UTRA, UMTS, LTE, LTE-A and GSM are described in documents from an organization named "3$^{rd}$ Generation Partnership Project" (3GPP). CDMA2000 and UMB are described in documents from an organization named "3$^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as Media-FLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
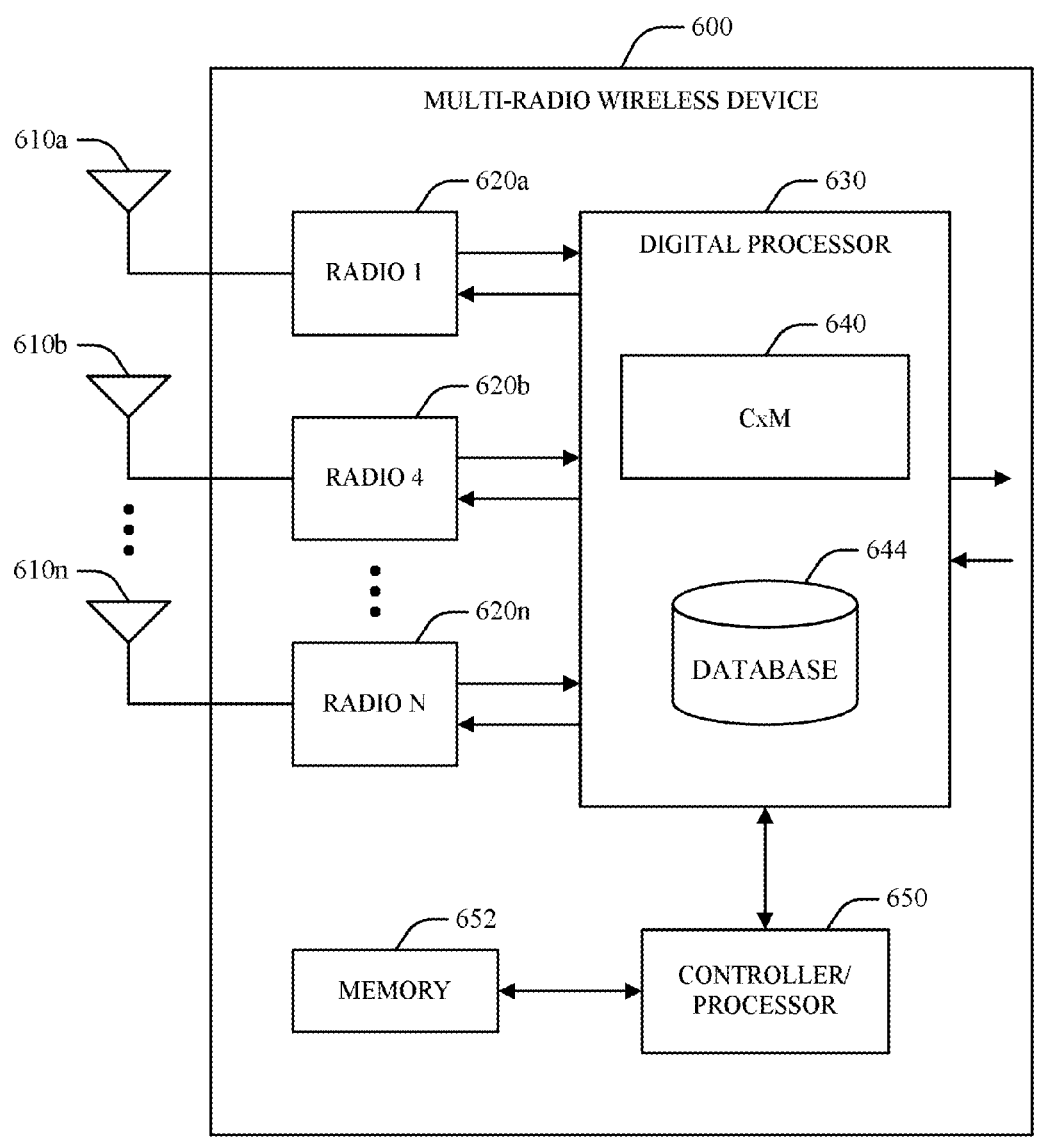
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a coexistence manager (CxM) 640 that can control operation of the radios 620 in order to improve the performance of the wireless device 600 as generally described herein. The coexistence manager 640 can have access to a database 644, which can store information used to control the operation of the radios 620. As explained further below, the coexistence manager 640 can be adapted for a variety of techniques to decrease interference between the radios. In one example, the coexistence manager 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a mobile station modem (MSM) ASIC.

Figure 7:
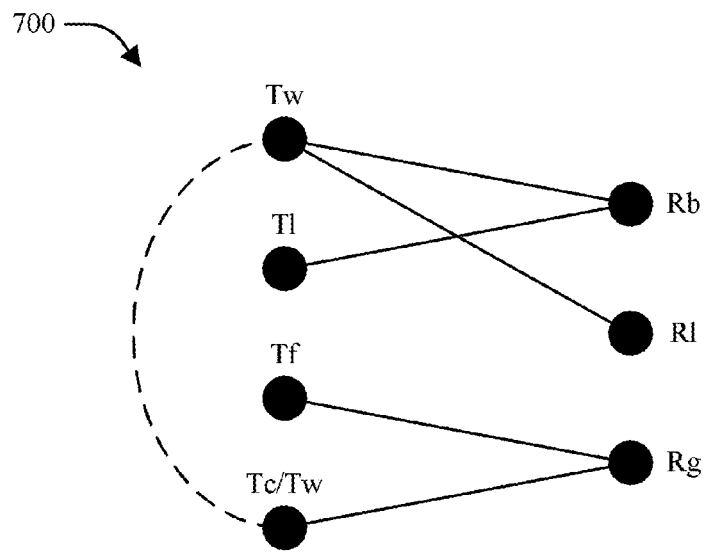
FIG. 7 is graph showing respective potential collisions between seven example radios in a given decision period.

In an aspect, the coexistence manager 640 can manage operation of respective radios 620 utilized by wireless device 600 in order to avoid interference and/or other performance degradation associated with collisions between respective radios 620. The coexistence manager 640 may perform one or more processes, such as those illustrated in FIG. 12. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
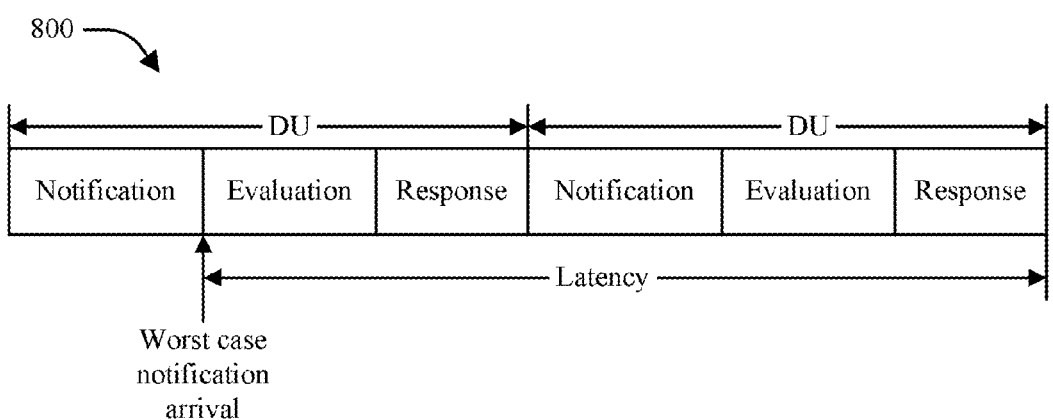
FIG. 8 is a diagram showing operation of an example coexistence manager (CxM) over time.

In one aspect, an example coexistence manager 640 can operate in time in a manner such as that shown by diagram 800 in FIG. 8. As diagram 800 illustrates, a timeline for coexistence manager operation can be divided into decision units (DUs), which can be any suitable uniform or non-uniform length (e.g., 100 μs) where notifications are processed, and a response phase (e.g., 20 μs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

Figure 9:
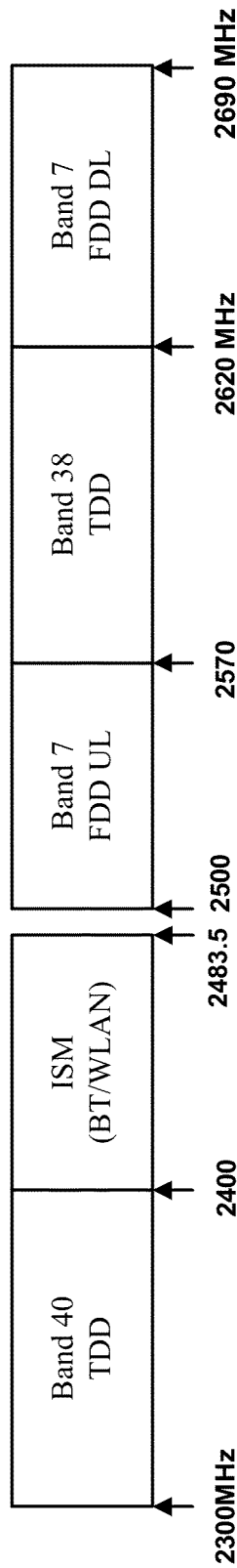
FIG. 9 is a block diagram illustrating adjacent frequency bands.

As shown in FIG. 9, long term evolution (LTE) in band 7 (for frequency division duplex (FDD) uplink), band 40 (for time division duplex (TDD) communication), and band 38 (for TDD downlink) is adjacent to the 2.4 GHz industrial scientific and medical (ISM) band used by Bluetooth (BT) and wireless local area network (WLAN) technologies. Frequency planning for these bands is such that there is limited or no guard band permitting traditional filtering solutions to avoid interference at adjacent frequencies. For example, a 20 MHz guard band exists between ISM and band 7, but no guard band exists between ISM and band 40.

To be compliant with appropriate standards, communication devices operating over a particular band are to be operable over the entire specified frequency range. For example, in order to be LTE compliant, a mobile station/user equipment should be able to communicate across the entirety of both band 40 (2300-2400 MHz) and band 7 (2500-2570 MHz) as defined by the 3rd generation partnership project (3GPP). Without a sufficient guard band, devices employ filters that overlap into other bands causing band interference. Because band 40 filters are 100 MHz wide to cover the entire band, the rollover from those filters crosses over into the ISM band causing interference. Similarly, ISM devices that use the entirety of the ISM band (e.g., from 2401 through approximately 2480 MHz) will employ filters that rollover into the neighboring band 40 and band 7 and may cause interference.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., reference signal received quality (RSRQ) metrics, etc.) reported by a UE and/or the downlink error rate which the eNB can use to make inter-frequency or inter-RAT handoff decisions to, e.g., move LTE to a channel or RAT with no coexistence issues. However, it can be appreciated that these existing techniques will not work if, for example, the LTE uplink is causing interference to Bluetooth/WLAN but the LTE downlink does not see any interference from Bluetooth/WLAN. More particularly, even if the UE autonomously moves itself to another channel on the uplink, the eNB can in some cases handover the UE back to the problematic channel for load balancing purposes. In any case, it can be appreciated that existing techniques do not facilitate use of the bandwidth of the problematic channel in the most efficient way.

Figure 10:
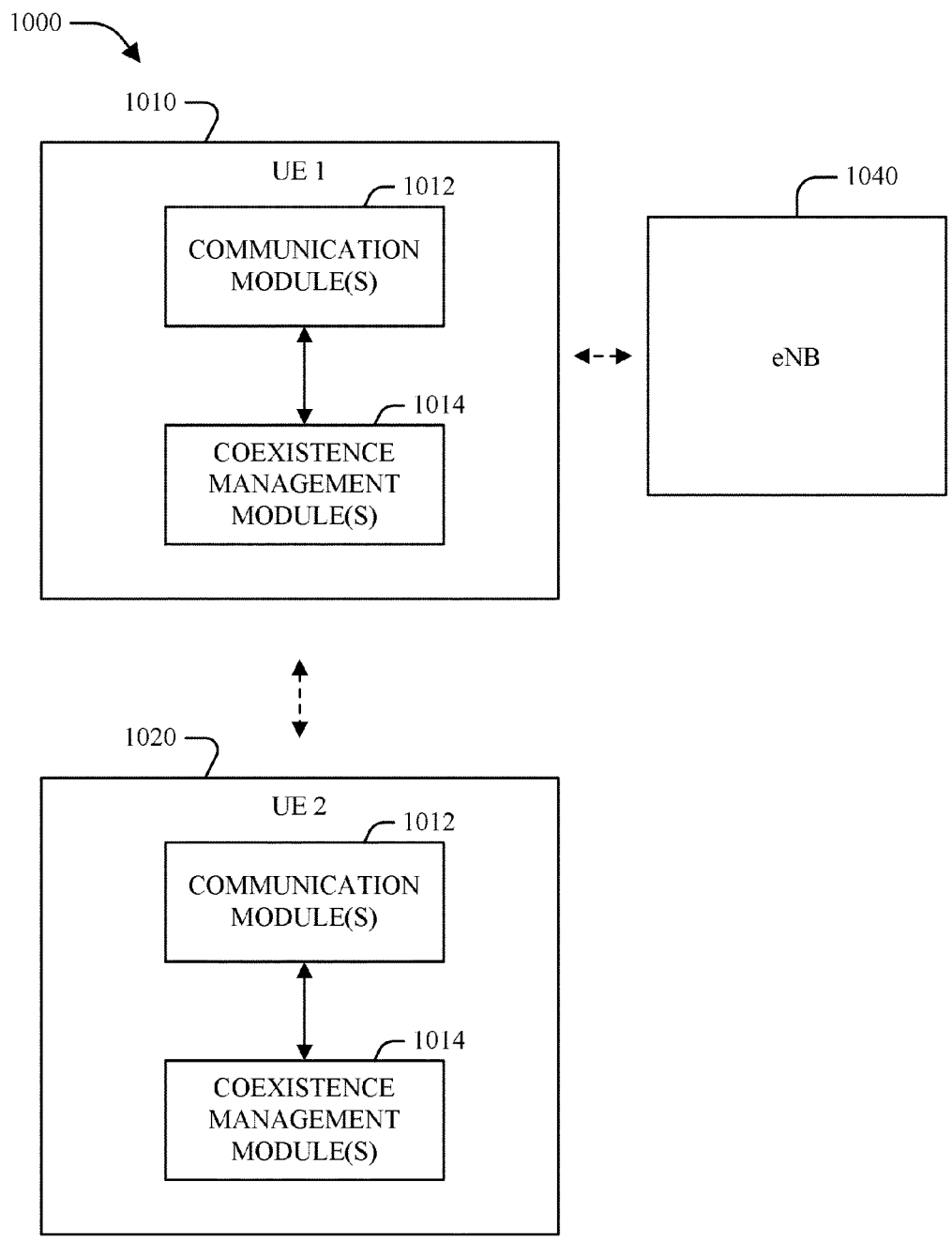
FIG. 10 is a block diagram of a system for providing support within a wireless communication environment for multi-radio coexistence management according to one aspect of the present disclosure.

Turning now to FIG. 10, a block diagram of a system 1000 for providing support within a wireless communication environment for multi-radio coexistence management is illustrated. In an aspect, the system 1000 can include one or more UEs 1010 and 1020 and/or eNBs 1040, which can engage in uplink and/or downlink communications, and/or any other suitable communication with each other and/or any other entities in the system 1000. In one example, the UE 1 1010 and/or eNB 1040 can be operable to communicate using a variety resources, including frequency channels and sub-bands, some of which can potentially be colliding with other radio resources (e.g., a broadband radio such as an LTE modem). The UE 1 1010 may also be involved in direct communications with UE 2 1020. Thus, the UE 1 1010 and/or the UE2 1020 can utilize various techniques for managing coexistence among multiple radios utilized by the UE 1 1010 and among multiple radios utilized by the UE 2 1020, as generally described herein.

To mitigate at least the above shortcomings, the UE 1010 can utilize respective features described herein and illustrated by the system 1000 to facilitate support for multi-radio coexistence within the UE 1010. For example, communication module(s) 1012 and coexistence management module(s) 1014 can be provided. The communication module(s) 1012 may include various modems, radios, or other communication components discussed herein. The coexistence management module(s) 1014 may, in some examples, be implemented as part of a coexistence manager such as the coexistence manager 640 of FIG. 6. The modules 1012-1014 and others may be configured to implement the embodiments discussed herein.

Managing Coexistence During Device-to-Device Communications

Multiple radios in a single device may cause interference to each other. For example, if a user equipment (UE) has both an LTE radio and an ISM radio such as a Bluetooth or wireless local area network (WLAN) radio, and the LTE radio is trying to transmit while the ISM radio is trying to receive, the LTE transmissions may interfere with ISM receptions. The same is true for ISM transmissions interfering with LTE receptions. Thus, devices that have multiple radios may employ various coexistence management solutions to improve or even optimize performance of the device's multiple radios to avoid interference between the on-device radios. Such solutions may include manipulating various communication configurations such as channel/band, power, frequency, timing (such as through TDM arrangements), etc.

Device-to-device communications, however, are becoming more popular. Such communications may include direct UE to UE communications (often referred to as "peer-to-peer" communications). They may also include UE to UE communications involving an intermediary, such as a base station or WiFi access point. Such communications can benefit from a multi-device or cross-multi-device coexistence management protocol that is specifically configured for device-to-device communications. This protocol may account for not only the device-to-device communications, but also any other ongoing communications of the individual UEs (or other devices) using their other radios (such as communications with their respective base stations, or other peripheral devices). Device-to-device (D2D) coexistence management may also take into account the individual coexistence management solutions currently being operated by the specific UEs involved in the device-to-device communications.

Figure 11:
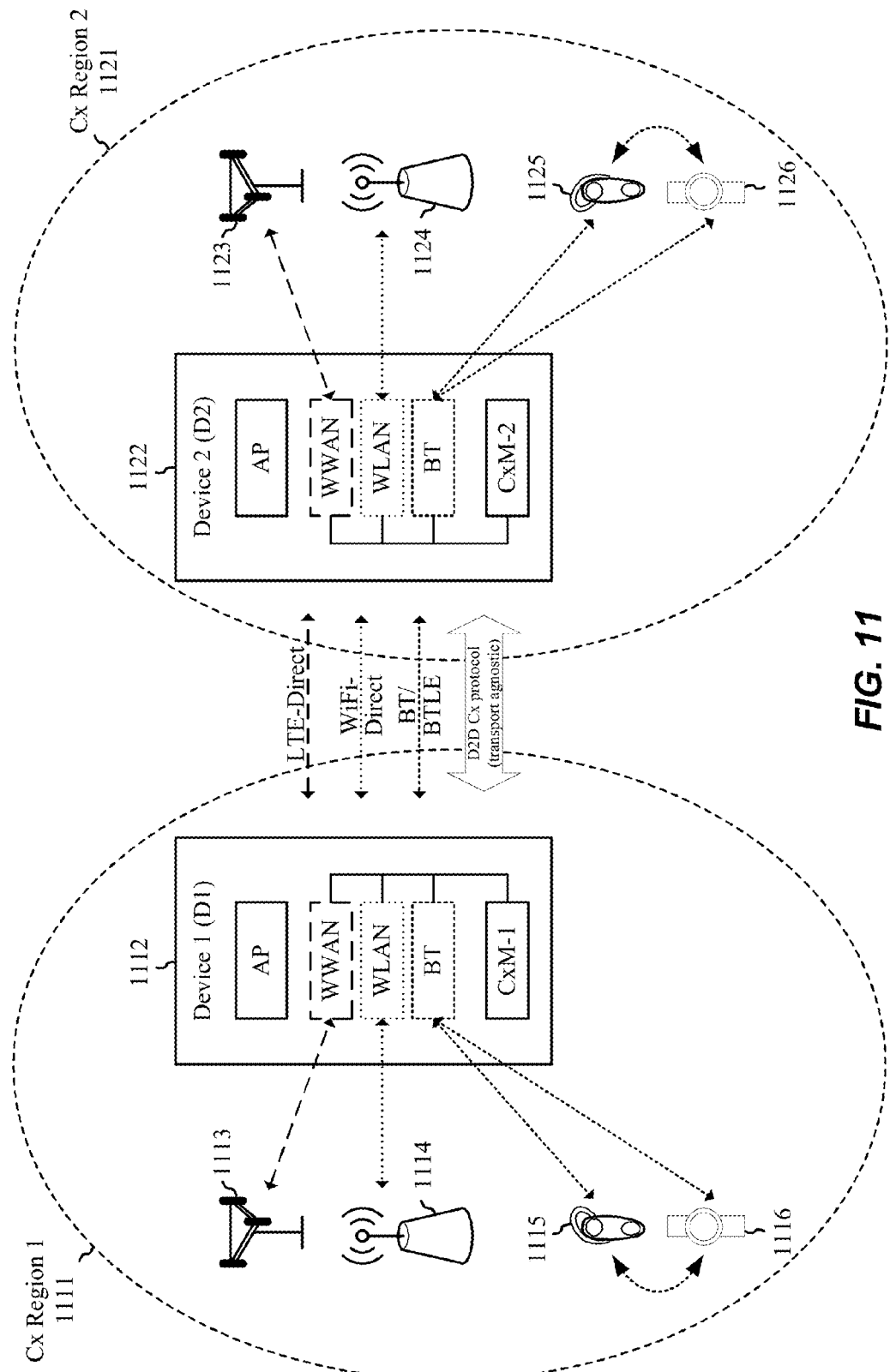
FIG. 11 is a block diagram illustrating device-to-device communications among multiple devices for purposes of managing device-to-device coexistence according to one aspect of the present disclosure.

FIG. 11 illustrates a problem. As can be seen in FIG. 11, each Device, D1 1112 and D2 1122 is associated with its own set of radios, which may be in regular communication with the respective base stations, access points, peripherals, etc. For example, for D1, the WWAN radio ($WWAN_{D1}$) is communicating with base station 1 (1113). Similarly, the WLAN radio of D1 ($WLAN_{D1}$) is communicating with access point 1 (1114). And the Bluetooth radio of D1 ($BT_{D1}$) is communicating with the peripheral devices of D1 (in particular headset 1115 and smartwatch 1116). Also, the headset 1115 may be communicating on its own with smartwatch 1116 using the Bluetooth radios of those individual peripheral devices. All these communications involving Device D1 may be considered the coexistence (Cx) region of Device D1 (labelled as Cx Region 1 1111). Similarly, all such communications involving Device D2 may be considered the coexistence (Cx) region of Device D2 (labelled as Cx Region 2 1121).

Each of D1 and D2 have their own coexistence managers (CxM-1 and CxM-2 respectively). These coexistence managers manage communications among the radios of Device 1 and Device 2, respectively, to reduce interference among their respective radios/peripherals (i.e., CxM-1 tries to reduce interference among radios in Cx Region 1 and CxM-2 tries to reduce interference among radios in Cx Region 2). That is, CxM-1 manages the radios in Device 1 1112 and CxM-2 manages radios in Device 2 1122. This scenario is also expandable to include multiple other devices that may wish to engage in D2D communications with D1, D2 and/or each other (e.g., D3, D4, etc.).

As an example, D1 may be operating in 2.4 GHz WiFi on channel 6 to communicate with $AP_1$, while simultaneously engaging in Bluetooth communications with peripherals 1115 and 1116 and communicating on LTE band 40 with base station 1113. At the same time, D2 may be operating in 2.4 GHz WiFi to communicate with access point 1124, while simultaneously engaging in Bluetooth communications with peripherals 1125 and 1126 and communicating using 3G with base station 1123. Each individual CxM of the devices will be focused on its own operation. Thus, CxM-1 will be managing communication parameters of D1 to improve/optimize D1 operation while CxM-2 will be managing communication parameters of D2 to improve/optimize D2 operation.

For the D2D communications, D1 and D2 may establish a direct link using at least one radio from each device. Any number of protocols may be used including LTE-Direct, WiFi-Direct, Bluetooth, Bluetooth-Low Energy (BTLE), or some other protocol that may be agnostic regarding the transport medium. As can be appreciated, the addition of new communications between D1 and D2 will impact the particular coexistence plans of each individual device D1 and D2. Thus, a protocol is desirable to manage the D2D communications to make sure they do not cause undesired interference to the ongoing individual communications of each device. Offered is such a D2D coexistence management protocol. The D2D coexistence protocol not only manages D2D communications, but also accounts for individual device coexistence management within each individual world (such as that traditionally handled by CxM-1 or CxM2). The D2D coexistence protocol may operate on one or both of the individual CxMs, CxM-1 or CxM2.

The D2D coexistence protocol may include a service discovery where each device exchanges coexistence information such as currently operating radios, their respective frequencies, powers, communication timing (i.e., frame configuration), frequency hopping, etc., that are operating within each individual device world. The exchange may also include other information such as location information, proximity information (i.e., how close the devices are to each other), the particular communication capabilities of each device, or other information. This exchange may happen over a preconfigured service discovery mode and may be over any particular RAT (WiFi, BT, etc.) One or both of the individual CxMs may then determine the best communication configuration for the D2D communications.

For example, taking the situation above, the protocol (as operated by one or both devices) may determine that WiFi at 5 GHz would be best for D2D communications, but is unavailable for some reason. The protocol may then determine that the best solution is WiFi channel 11 as it least impacts D1 LTE operations because channel 11 is farther away in frequency from Band 40 on D1. The protocol may also call for D1 to back off its WiFi transmission power to D2 by 3 dB to reduce interference to other communications while maintaining sufficient throughput for the D2D communications (due to the devices being in relatively close proximity for example). The protocol may also adjust the Bluetooth adaptive frequency hopping (AFH) of one or more devices to reduce interference.

The protocol may be configured to allow for the exchange of messages between connecting devices to achieve an agreeable improved coexistence state in each device for the duration of a D2D message exchange. The protocol may call for one device sacrificing the performance of one of its radios in order to improve the device-to-device exchange. The advantage over current practice is an improved user experience for the device-to-device data exchange. If each device performed its own coexistence management independently of the other device but with its device's D2D link included in its coexistence management solution, the overall coexistence solution would become overly complicated, resulting in decreased performance of each individual device. This is generally true because the more radios involved in a coexistence solution, the more compromises are needed hence individual radio performance is compromised. This includes the D2D communication link potentially suffering from an otherwise lack of coexistence management across devices that interfere with one another.

Various configurations of the protocol are possible. In general, a use case includes two or more devices, with two or more potentially interfering radio modems in each device, a coexistence manager in each device, and a device to device coexistence management protocol governing at least the D2D communications (and possibly also managing non-D2D communications, such as the communications involving only one device). The CxM of the first device is responsible for managing communications of the first device (i.e., independent of the D2D communications). Similarly, the CxM of the second device is responsible for managing communications of the second device (i.e., independent of the D2D communications).

One device may initiate a data exchange request to another device in a D2D fashion to exchange preliminary information regarding communications, coexistence (Cx) states, etc., among the devices. Thus, the protocol may include an initial coexistence state discovery across devices. This may include devices exchanging their current coexistence status (including active RATs, operating frequency, power, etc., the problems they are experiencing, and potential solutions to their coexistence problem, if the coexistence problem exists at all or if no coexistence solution is known). The D2D coexistence management protocol determines acceptable coexistence parameter changes for the data exchange, similarly to current coexistence protocols, only now considering all the various active radios. The D2D coexistence management protocol may also call for one or more devices to agree to a RAT degradation of some kind. Each device may operate under the D2D coexistence management protocol for the duration of the D2D communications.

The D2D coexistence management protocol may also consider the priority of individual applications operating on the individual devices (i.e., programs running on the individual devices, or traffic streams such as a video, voice, or data transfer). An individual application may have a device level priority that is a certain priority compared to other applications running on the particular device. An individual application may also have a priority according to the D2D communications, which is a certain priority compared to other applications running on both the particular device and other device(s) participating in the D2D communications. The D2D coexistence management protocol may consider such priorities.

The D2D coexistence management protocol/CxM may determine RAT communication priorities by examining the communication traffic and interface state for each radio and/or device. For example, a CxM may measure the data rate flowing through each RAT interface, and may infer that high data rate implies a higher priority. The CxM may gather control packets to each radio, to determine the type of traffic sent to each radio, and can infer priority based on traffic type. For example, VoIP may be given higher priority. A host device may set the wireless application priorities via an application programming interface (API) to the CxM. As an alternative, the CxM may assign a priority to a particular application/traffic type, but may adjust a data rate to avoid the particular application being allocated too high a throughput (thus impacting data from other applications). For example, VoIP traffic may have a high priority but low data rate.

Many different examples of D2D coexistence management solutions are possible. Several examples are listed below. Each example considers a pair of devices where each device's individual CxM is operating to manage its own respective operation (thus the Device 1 CxM attempts to optimize Device 1 communications and the Device 2 CxM attempts to optimize Device 2 communications). Device 1 is considered to be communicating using WiFi at 2.4 GHz, Bluetooth and LTE in Band 40. Device 2 is considered to be communicating using WiFi at 2.4 GHz, Bluetooth and 3G. As direct communications between Device 1 and Device 2 are attempted, the CxMs of the respective devices may exchange messages to determine the overall communications of each device, and arrive at the recited D2D coexistence management plan. The individual devices may then communicate using the D2D Cx management plan and/or the individual coexistence management plans of the individual devices (which may be superseded by the D2D Cx management plan, or may be operable simultaneously with the D2D Cx management plan.)

Example 1

Device 1's WiFi communications are on Channel 6 and Device 2's WiFi communications are on Channel 1. The device(s) determine that WiFi-Direct communications at 5 GHz are available and thus coordinate the D2D communications between Device 1 and Device 2 using WiFi Direct at 5 GHz.

Example 2(a)

Device 1's WiFi communications are on Channel 6 and Device 2's WiFi communications are on Channel 1. The device(s) determine that WiFi-Direct communications at 5 GHz are unavailable (potentially due to other interference or due to communications at the 5 GHz band being unsupported, out of range, consuming too much power, etc.) Therefore, the devices determine that D2D communications between Device 1 and Device 2 should occur on WiFi Channel 11 as such communications would have a limited impact on Device 1's LTE Band 40 communications. The individual coexistence managers of the respective devices may adjust their respective non-D2D communications to compensate.

Example 2(b)

Device 1's WiFi communications are on Channel 6 and Device 2's WiFi communications are on Channel 1. The device(s) determine that D2D communications between Device 1 and Device 2 should occur on WiFi Channel 11 as such communications would have a limited impact on Device 1's LTE Band 40 communications. The device(s) also determine that the D2D communications should be subject to a power backoff to reduce the impact to Device 1's LTE Band 40 communications. The individual coexistence managers of the respective devices may adjust their respective non-D2D communications to compensate.

Example 3

Device 1's WiFi communications are on Channel 6 and Device 2's WiFi communications are on Channel 1. The device(s) determine that LTE-Direct D2D communications using Band 40 at 2310 MHz are preferred, as this frequency is sufficiently away from the ISM band. Thus, D2D communications using this configuration may occur without impacting the respective non-D2D Cx management.

Example 4

Device 1's WiFi communications are on Channel 6 and Device 2's WiFi communications are on Channel 1. The device(s) determine that LTE-Direct D2D communications using Band 17 are preferred, as this band is sufficiently away from the ISM band. Thus, D2D communications using this configuration may occur without impacting the respective non-D2D Cx management.

Example 5

Device 1's WiFi communications are on Channel 6 and Device 2's WiFi communications are on Channel 11. The device(s) determine that WiFi communications should be maintained at 2.4 GHz and that D2D communications are possible using WiFi-Direct on Channel 1. To enable such D2D communications, Device 1 reconfigures its own internal communications to implement a power backoff on its LTE Band 40 communications. The amount and/or timing of the backoff is sufficient to enable D2D communications between Device 1 and Device 2 using WiFi-Direct on Channel 1. Device 1 may adjust its own internal coexistence management plan to incorporate the LTE power backoff.

Example 6

Device 1's WiFi communications are on Channel 6 and Device 2's WiFi communications are on Channel 1. The device(s) determine that LTE-Direct D2D communications using Band 40 is preferred. To enable such D2D communications, Device 2 reconfigures its own internal communications to implement a power backoff on its WiFi Channel 1 communications. The amount and/or timing of the backoff is sufficient to enable D2D communications between Device 1 and Device 2 using LTE-Direct on Band 40. Device 2 may adjust its own internal coexistence management plan to incorporate the WiFi power backoff.

Example 7

Device 1's WiFi communications are on Channel 6 and Device 2's WiFi communications are on Channel 1. The device(s) determine that Bluetooth Direct communications are preferred, where the Bluetooth adaptive frequency hopping (AFH) sequence is configured to avoid the respective device's WiFi and/or LTE Band 40 communications (either in time and/or frequency). Thus, in this example the Bluetooth AFH sequence is configured to avoid Device 1's WiFi communications on Channel 6, Device 1's LTE communications on Band 40, and Device 2's WiFi communications on Channel 6. The individual coexistence managers of the respective devices may adjust their respective non-D2D communications (and in particular their respective other Bluetooth communications) to compensate.

In another example of implementation of a D2D coexistence management protocol by one or more CxMs, the D2D coexistence management protocol may involve frequency/channel selection. A device CxM may determine a desired Bluetooth AFH sequence and engage in protocol exchange messages related to its coexistence condition (and those of other devices engaged in D2D communications) to determine a mutually acceptable AFH sequence. Such adjustment of Bluetooth AFH patterns may be implemented, for example, in cases where there are communication frequencies for other RATs (such as WiFi, LTE, etc.) being used that are proximate to the Bluetooth 2.4 GHz band.

In one mode, a device may select an AFH sequence and force it upon another device. In this mode, a device CxM determines a desired Bluetooth AFH sequence for its device and, if in the Bluetooth slave role, initiates a Bluetooth role reversal with the paired device to become the Bluetooth link master. The external Bluetooth modem slave accepts the new AFH sequence.

In another mode, a device may engage in an engagement mode with another device whereby a device CxM assigns a desired Bluetooth AFH sequence for its device and engages in protocol exchange messages related to each device's coexistence condition to determine mutually acceptable AFH sequences. Meanwhile, the device's CxM may determine its desired WLAN-Direct channel and engage in protocol exchange messages related to each device's coexistence condition to determine mutually acceptable channels. The device's CxM may also determine its desired LTE-Direct channel and engage in protocol exchange messages related to each device's coexistence condition to determine mutually acceptable channels. The device's CxM may also engage in similar analysis for other coexistence parameters such as transmission power, communication scheduling/timing, etc.

Figure 12:
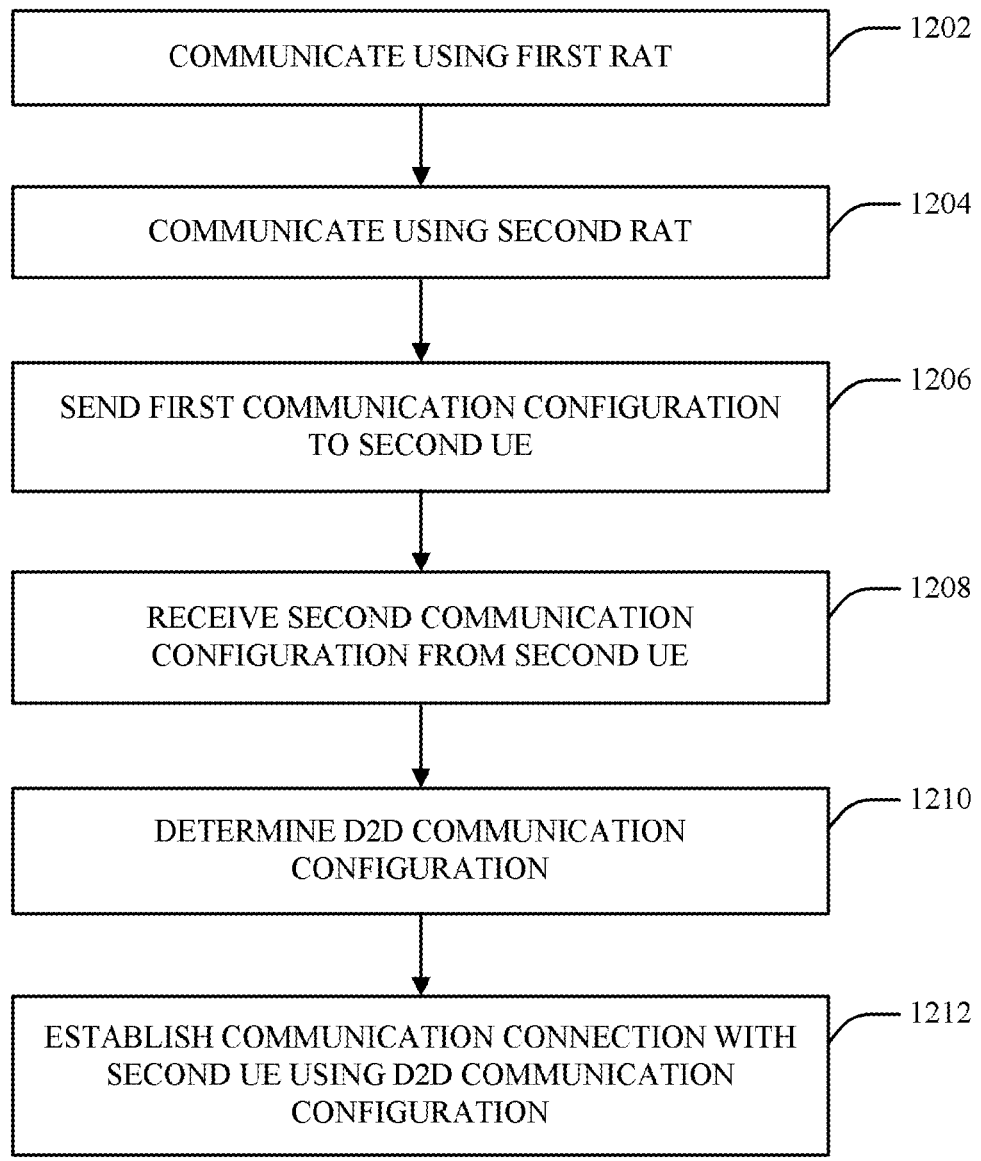
FIG. 12 is a flow diagram illustrating a method for managing device-to-device coexistence according to one aspect of the present disclosure.

As shown in FIG. 12 a first UE may execute a method comprising communicating using a first radio of the first UE, as shown in block 1202. The method may also include communicating using a second radio of the first UE, as shown in block 1204. The method may also include sending a second UE a first communication configuration, as shown in block 1206. The first communication configuration may describe the first UE's communications using the first radio and the second radio and may describe a first coexistence solution being operated by the first UE.

The method may also include receiving a second communication configuration from the second UE, as shown in block 1208. The second communication configuration may describe the second UE's communications using at least one radio of the second UE and may describe a second coexistence solution being operated by the second UE. method may also include determining a device-to-device (D2D) communication configuration, as shown in block 1210. The device-to-device communication configuration may govern communications between the first UE and the second UE. The device-to-device communication configuration may be based on the first communication configuration and the second communication configuration. method may also include establishing a communication connection with the second UE using the device-to-device communication configuration, as shown in block 1212.

The method may also include sending the first communication configuration to a third UE and receiving from the third UE a third communication configuration. The third communication configuration describing the third UE's communications using at least one radio of the third UE and describing a third coexistence solution being operated by the third UE. The method may also include establishing a communication connection with the third UE using the device-to-device communication configuration, in which the device-to-device communication configuration further governs communications between the first UE and the third UE.

The communication connection with the second UE may include an intermediary communication node between the first UE and the second UE. The device-to-device communication configuration comprises a Bluetooth adaptive frequency hopping (AFH) configuration for the first UE. The device-to-device communication configuration may comprise an alteration to at least one of the first coexistence solution or the second coexistence solution. The communication connection with the second UE may involve communications using at least one of Bluetooth, Bluetooth-Low Energy, LTE-Direct, or WiFi-Direct.

Figure 13:
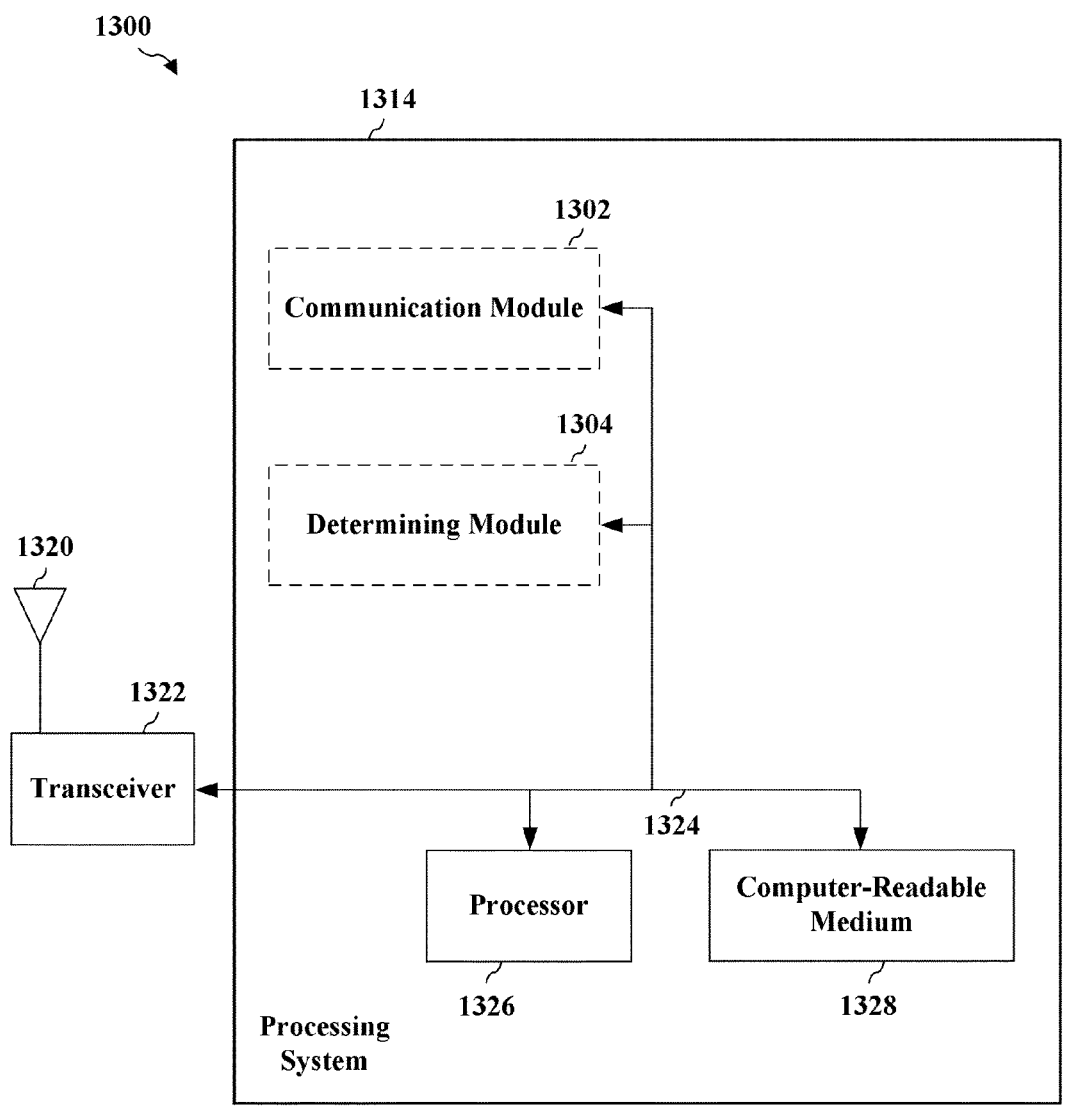
FIG. 13 is a diagram illustrating an example of a hardware implementation for an apparatus employing components for managing device-to-device coexistence.

FIG. 13 is a diagram illustrating an example of a hardware implementation for an apparatus 1300 employing a system 1314. The system 1314 may be implemented with a bus architecture, represented generally by a bus 1324. The bus 1324 may include any number of interconnecting buses and bridges depending on the specific application of the system 1314 and the overall design constraints. The bus 1324 links together various circuits including one or more processors and/or hardware modules, represented by a processor 1326, a communication module 1302, a determining module 1304, and a computer-readable medium 1328. The bus 1324 may also link various other circuits such as timing sources, peripherals, voltage regulators, and power management circuits, which are well known in the art, and therefore, will not be described any further.

The apparatus includes the system 1314 coupled to a transceiver 1322. The transceiver 1322 is coupled to one or more antennas 1320. The transceiver 1322 provides a means for communicating with various other apparatus over a transmission medium. The system 1314 includes the processor 1326 coupled to the computer-readable medium 1328. The processor 1326 is responsible for general processing, including the execution of software stored on the computer-readable medium 1328. The software, when executed by the processor 1326, causes the system 1314 to perform the various functions described supra for any particular apparatus. The computer-readable medium 1328 may also be used for storing data that is manipulated by the processor 1326 when executing software. The system 1314 further includes the communication module 1302 for exchanging communications with other devices, such as a base station or another UE (such as during device-to-device communications) and the determining module 1304 for determining a device-to-device communication configuration that may govern communications between the first UE and the second UE. The device-to-device communication configuration (which may be a device-to-device coexistence management plan) may be based on a first communication configuration (a coexistence management plan for a first device) and the second communication configuration (a coexistence management plan for a second device). The communication module 1302 and the determining module 1304 may include software modules running in the processor 1326, resident/stored in the computer-readable medium 1328, one or more hardware modules coupled to the processor 1326, or some combination thereof. The system 1314 may be a component of the UE 250 and may include the memory 272 and/or the processor 270.

In one configuration, the apparatus 1300 for wireless communication includes means for communicating and means for establishing a communication connection. The means may be the communication module 1302 and/or the system 1314 of the apparatus 1300 configured to perform the functions recited by the means. The means may also include the communication module(s) 1012, radio(s) 620, processor 270/650/1326, memory 272/652, computer-readable medium 1328, antennas 252/610/1320, transceiver 1322, and/or transmitter/receiver 254. In another aspect, the aforementioned means may be any module or any apparatus configured to perform the functions recited by the aforementioned means.

In one configuration, the apparatus 1300 for wireless communication includes means for sending. The means may be the communication module 1302 and/or the system 1314 of the apparatus 1300 configured to perform the functions recited by the means. The means may also include the communication module(s) 1012, the antennas 252/610/1320, radio(s) 620, processor 270/650/1326, memory 272/652, computer-readable medium 1328, transceiver 1322, and/or transmitter 254. In another aspect, the aforementioned means may be any module or any apparatus configured to perform the functions recited by the aforementioned means.

In one configuration, the apparatus 1300 for wireless communication includes means for receiving. The means may be the communication module 1302 and/or the system 1314 of the apparatus 1300 configured to perform the functions recited by the means. The means may also include the communication module(s) 1012, the antennas 252/610/1320, radio(s) 620, processor 270/650/1326, memory 272/652, computer-readable medium 1328, transceiver 1322, and/or receiver 254. In another aspect, the aforementioned means may be any module or any apparatus configured to perform the functions recited by the aforementioned means.

In one configuration, the apparatus 1300 for wireless communication includes means for determining. The means may be the determining module 1304 and/or the system 1314 of the apparatus 1300 configured to perform the functions recited by the means. The means may also include the coexistence management module(s) 1014, CxM 640, memory 272/652, computer-readable medium 1328 and/or processor 270/650/1326. In another aspect, the aforementioned means may be any module or any apparatus configured to perform the functions recited by the aforementioned means.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method performed by a first user equipment (UE), the method comprising:
communicating using a first radio of the first UE;
communicating using a second radio of the first UE;
sending a second UE a first communication configuration, the first communication configuration describing the first UE's communications using the first radio and the second radio and describing a status of interference between the first radio and the second radio and a first coexistence management solution being operated by the first UE to avoid at least one of interference between the first radio and the second radio and performance degradation;
receiving from the second UE a second communication configuration, the second communication configuration describing the second UE's communications using at least one radio of second in-device radios of the second UE and describing a status of interference between the second in-device radios and a second coexistence management solution being operated by the second UE to avoid at least one of interference between the second in-device radios and performance degradation;
determining a device-to-device communication configuration, the device-to-device communication configuration governing communications between the first UE and the second UE, in which the device-to-device communication configuration is based at least in part on the first communication configuration and the second communication configuration; and
establishing a communication connection with the second UE using the device-to-device communication configuration.

2. The method of claim 1, further comprising:
sending the first communication configuration to a third UE;
receiving from the third UE a third communication configuration, the third communication configuration describing the third UE's communications using at least one radio of the third UE and describing a third coexistence management solution being operated by the third UE; and
establishing a communication connection with the third UE using the device-to-device communication configuration, in which the device-to-device communication configuration further governs communications between the first UE and the third UE.

3. The method of claim 1, in which the communication connection with the second UE includes an intermediary communication node between the first UE and the second UE.

4. The method of claim 1, in which the device-to-device communication configuration comprises a Bluetooth adaptive frequency hopping (AFH) configuration for the first UE.

5. The method of claim 1, in which the device-to-device communication configuration comprises an alteration to at least one of the first coexistence management solution or the second coexistence management solution.

6. The method of claim 1, in which the communication connection with the second UE involves communications using at least one of Bluetooth, Bluetooth-Low Energy, LTE-Direct, or WiFi-Direct.

7. An apparatus for wireless communications, comprising:
means for communicating using a first radio of a first user equipment (UE);
means for communicating using a second radio of the first UE;
means for sending a second UE a first communication configuration, the first communication configuration describing the first UE's communications using the first radio and the second radio and describing a status of interference between the first radio and the second radio and a first coexistence management solution being operated by the first UE to avoid at least one of interference between the first radio and the second radio and performance degradation;
means for receiving from the second UE a second communication configuration, the second communication configuration describing the second UE's communications using at least one radio of second in-device radios of the second UE and describing a status of interference between the second in-device radios and a second coexistence management solution being operated by the second UE to avoid at least one of interference between the second in-device radios and performance degradation;
means for determining a device-to-device communication configuration, the device-to-device communication configuration governing communications between the first UE and the second UE, in which the device-to-device communication configuration is based at least in part on the first communication configuration and the second communication configuration; and
means for establishing a communication connection with the second UE using the device-to-device communication configuration.

8. The apparatus of claim 7, further comprising:
means for sending the first communication configuration to a third UE;
means for receiving from the third UE a third communication configuration, the third communication configuration describing the third UE's communications using at least one radio of the third UE and describing a third coexistence management solution being operated by the third UE; and
means for establishing a communication connection with the third UE using the device-to-device communication configuration, in which the device-to-device communication configuration further governs communications between the first UE and the third UE.

9. The apparatus of claim 7, in which the communication connection with the second UE includes an intermediary communication node between the first UE and the second UE.

10. The apparatus of claim 7, in which the device-to-device communication configuration comprises a Bluetooth adaptive frequency hopping (AFH) configuration for the first UE.

11. A computer program product configured for wireless communication, the computer program product comprising:
a non-transitory computer-readable medium having program code recorded thereon which, when executed by at least one processor(s), causes the processor(s):
to communicate using a first radio of a first user equipment (UE);
to communicate using a second radio of the first UE;
to send a second UE a first communication configuration, the first communication configuration describing the first UE's communications using the first radio and the second radio and describing a status of interference between the first radio and the second radio and a first coexistence management solution being operated by the first UE to avoid at least one of interference between the first radio and the second radio and performance degradation;

to receive from the second UE a second communication configuration, the second communication configuration describing the second UE's communications using at least one radio of second in-device radios of the second UE and describing a status of interference between the second in-device radios and a second coexistence management solution being operated by the second UE to avoid at least one of interference between the second in-device radios and performance degradation;

to determine a device-to-device communication configuration, the device-to-device communication configuration governing communications between the first UE and the second UE, in which the device-to-device communication configuration is based at least in part on the first communication configuration and the second communication configuration; and to establish a communication connection with the second UE using the device-to-device communication configuration.

12. The computer program product of claim 11, in which the program code further causes the processor(s):

to send the first communication configuration to a third UE;

to receive from the third UE a third communication configuration, the third communication configuration describing the third UE's communications using at least one radio of the third UE and describing a third coexistence management solution being operated by the third UE; and to establish a communication connection with the third UE using the device-to-device communication configuration, in which the device-to-device communication configuration further governs communications between the first UE and the third UE.

13. The computer program product of claim 11, in which the communication connection with the second UE includes an intermediary communication node between the first UE and the second UE.

14. The computer program product of claim 11, in which the device-to-device communication configuration comprises a Bluetooth adaptive frequency hopping (AFH) configuration for the first UE.

15. An apparatus for wireless communications, comprising:

a memory; and at least one processor coupled to the memory, the at least one processor being configured:

to communicate using a first radio of a first user equipment (UE);

to communicate using a second radio of the first UE;

to send a second UE a first communication configuration, the first communication configuration describing the first UE's communications using the first radio and the second radio and describing a status of interference between the first radio and the second radio and a first coexistence management solution being operated by the first UE to avoid at least one of interference between the first radio and the second radio and performance degradation;

to receive from the second UE a second communication configuration, the second communication configuration describing the second UE's communications using at least one radio of second in-device radios of the second UE and describing a status of interference between the second in-device radios and a second coexistence management solution being operated by the second UE to avoid at least one of interference between the second in-device radios and performance degradation;

to determine a device-to-device communication configuration, the device-to-device communication configuration governing communications between the first UE and the second UE, in which the device-to-device communication configuration is based at least in part on the first communication configuration and the second communication configuration; and to establish a communication connection with the second UE using the device-to-device communication configuration.

16. The apparatus of claim 15, in which the at least one processor is further configured:

to send the first communication configuration to a third UE;

to receive from the third UE a third communication configuration, the third communication configuration describing the third UE's communications using at least one radio of the third UE and describing a third coexistence management solution being operated by the third UE; and to establish a communication connection with the third UE using the device-to-device communication configuration, in which the device-to-device communication configuration further governs communications between the first UE and the third UE.

17. The apparatus of claim 15, in which the communication connection with the second UE includes an intermediary communication node between the first UE and the second UE.

18. The apparatus of claim 15, in which the device-to-device communication configuration comprises a Bluetooth adaptive frequency hopping (AFH) configuration for the first UE.

19. The apparatus of claim 15, in which the device-to-device communication configuration comprises an alteration to at least one of the first coexistence management solution or the second coexistence management solution.

20. The apparatus of claim 15, in which the communication connection with the second UE involves communications using at least one of Bluetooth, Bluetooth-Low Energy, LTE-Direct, or WiFi-Direct.

* * * * *